United States Patent [19]

Ozolins et al.

[11] Patent Number: 4,765,461

[45] Date of Patent: Aug. 23, 1988

[54] MOBILE ELEVATOR CONVEYOR

[75] Inventors: Imants Ozolins, Preston; Gary L. James, Mont Albert, both of Australia

[73] Assignee: Minenco Pty. Limited, Melbourne, Australia

[21] Appl. No.: 862,813

[22] Filed: May 13, 1986

[30] Foreign Application Priority Data

May 23, 1985 [AU] Australia .................... PH0702

[51] Int. Cl.$^4$ ............................. B65G 15/26
[52] U.S. Cl. ................................. 198/311
[58] Field of Search ............. 414/139, 144; 198/311, 198/313, 314

[56] References Cited

U.S. PATENT DOCUMENTS

| | | | |
|---|---|---|---|
| 3,244,299 | 4/1966 | Girardi | 198/313 |
| 3,598,224 | 8/1971 | Oury | 198/313 |
| 3,688,893 | 9/1972 | Wallace, Jr. | 414/139 |
| 3,722,477 | 3/1973 | Weldy et al. | 198/313 |
| 3,884,528 | 5/1975 | Shaddock | 414/139 |
| 3,917,051 | 11/1975 | Pennings et al. | 198/313 |
| 4,008,797 | 2/1977 | Nelson | 198/313 |
| 4,058,198 | 11/1977 | O'Neill et al. | 198/313 |
| 4,230,220 | 10/1980 | Ilno | 414/144 |
| 4,236,857 | 12/1980 | Willi | 414/139 |
| 4,343,389 | 8/1982 | Ponstein | 198/318 |
| 4,350,241 | 9/1982 | Wenzel | 198/318 |
| 4,440,537 | 4/1984 | Blattermann et al. | 414/139 |
| 4,518,079 | 5/1985 | Paelke | 198/861.2 |
| 4,523,669 | 6/1985 | Smith | 198/313 |
| 4,537,302 | 8/1985 | Gsponer et al. | 414/139 |
| 4,585,384 | 4/1986 | Richard et al. | 414/139 |

FOREIGN PATENT DOCUMENTS

| | | | |
|---|---|---|---|
| 693282 | 6/1940 | Austria | 198/313 |
| 612950 | 1/1961 | Canada | 198/861.2 |
| 189218 | 7/1986 | European Pat. Off. | 414/139 |
| 1160796 | 1/1964 | Fed. Rep. of Germany | 414/144 |
| 2932113 | 2/1981 | Fed. Rep. of Germany | 414/144 |
| 3006882 | 9/1981 | Fed. Rep. of Germany | 414/139 |
| 3215398 | 10/1983 | Fed. Rep. of Germany | 414/139 |
| 203885 | 11/1983 | Fed. Rep. of Germany | 414/139 |

*Primary Examiner*—Gary L. Smith
*Assistant Examiner*—Eric K. Nicholson
*Attorney, Agent, or Firm*—Merchant, Gould, Smith, Edell, Welter & Schmidt

[57] ABSTRACT

A mobile elevator conveyor, comprising a main support structure (10) mounted on tracks (11), for mobility along an upper level (14) when in use, an elevating conveyor (13) supported on a boom (12) adapted to be extended from a retracted position within the main frame to an extended position outwardly of said main frame. The boom supporting the conveyor is formed from a plurality of boom segments (22), and is adapted, during extension and retraction, to pass over an outwardly and downwardly curving guide frame (29) mounted on said main support structure. The boom segments are hingedly connected at their lower edges such that the boom structure bends downwardly along its bottom chord at the hinges (23) between the boom segments as it moves over the guide frame, and down to a lower level (15). The interaction of the boom segments is such that bending in the opposite direction is resisted so as to form a rigid boom structure. A collecting conveyor (38) extends along the length of the main support structure and receives material from said elevating conveyor and conveys it to a discharge point.

17 Claims, 5 Drawing Sheets

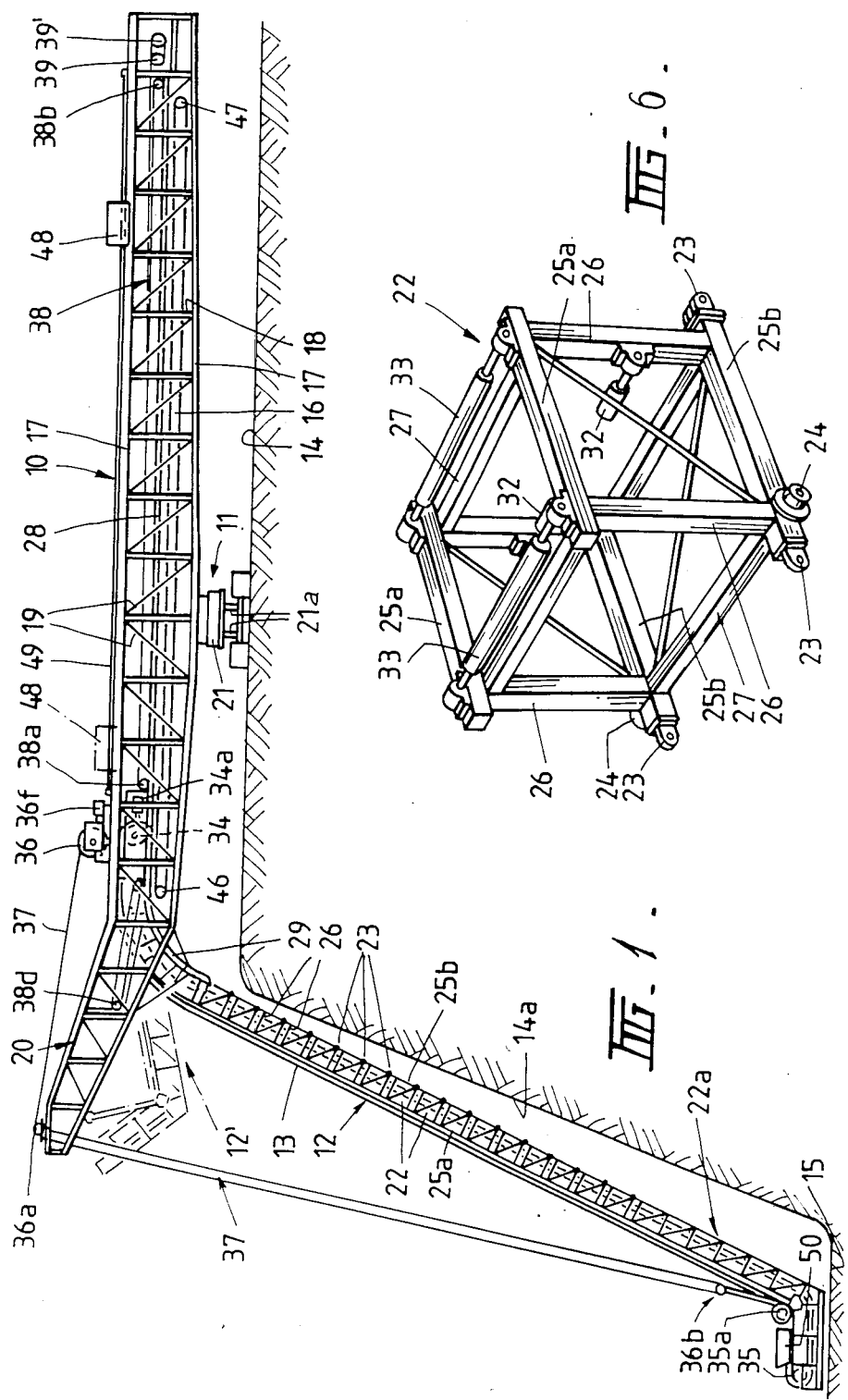

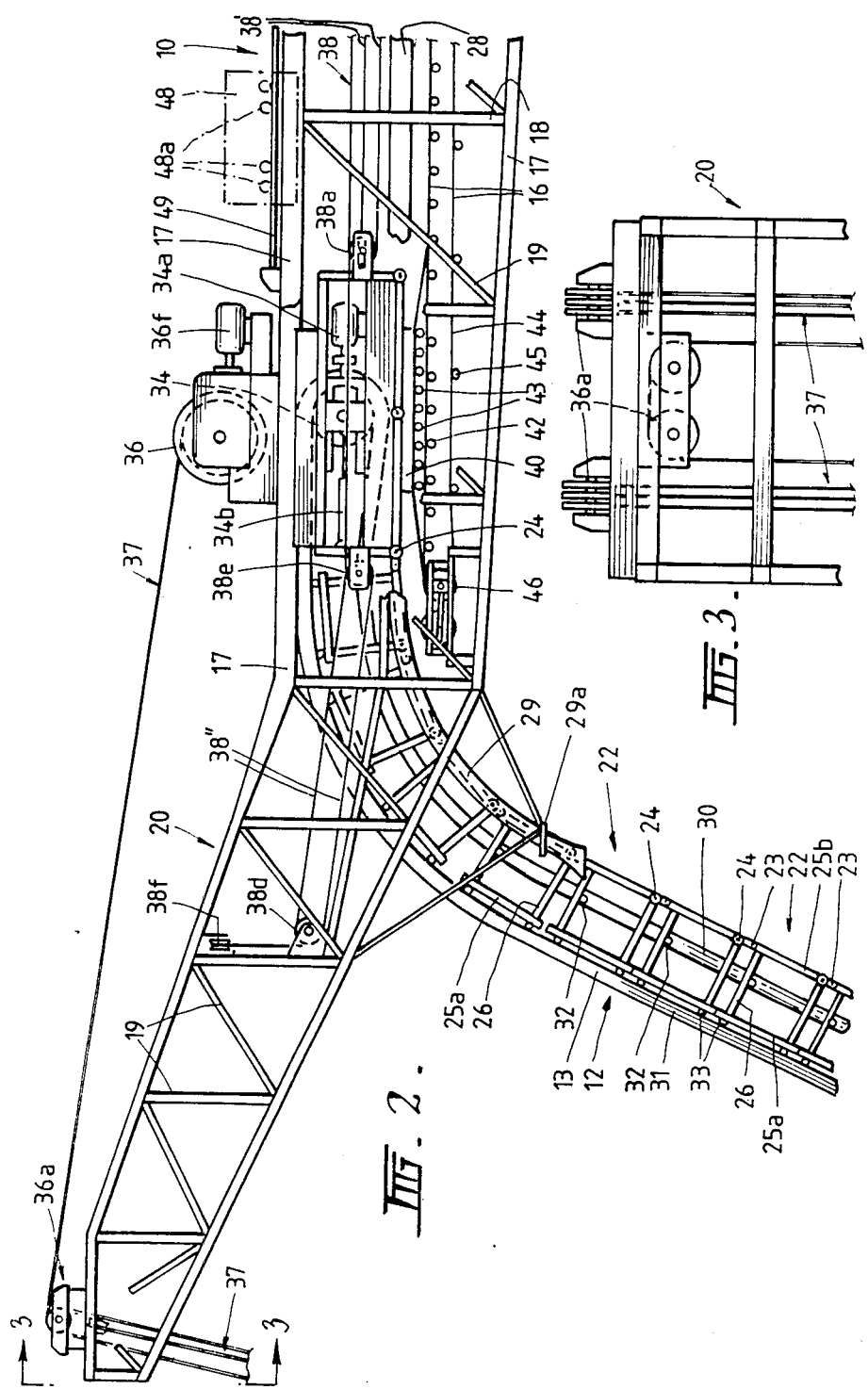

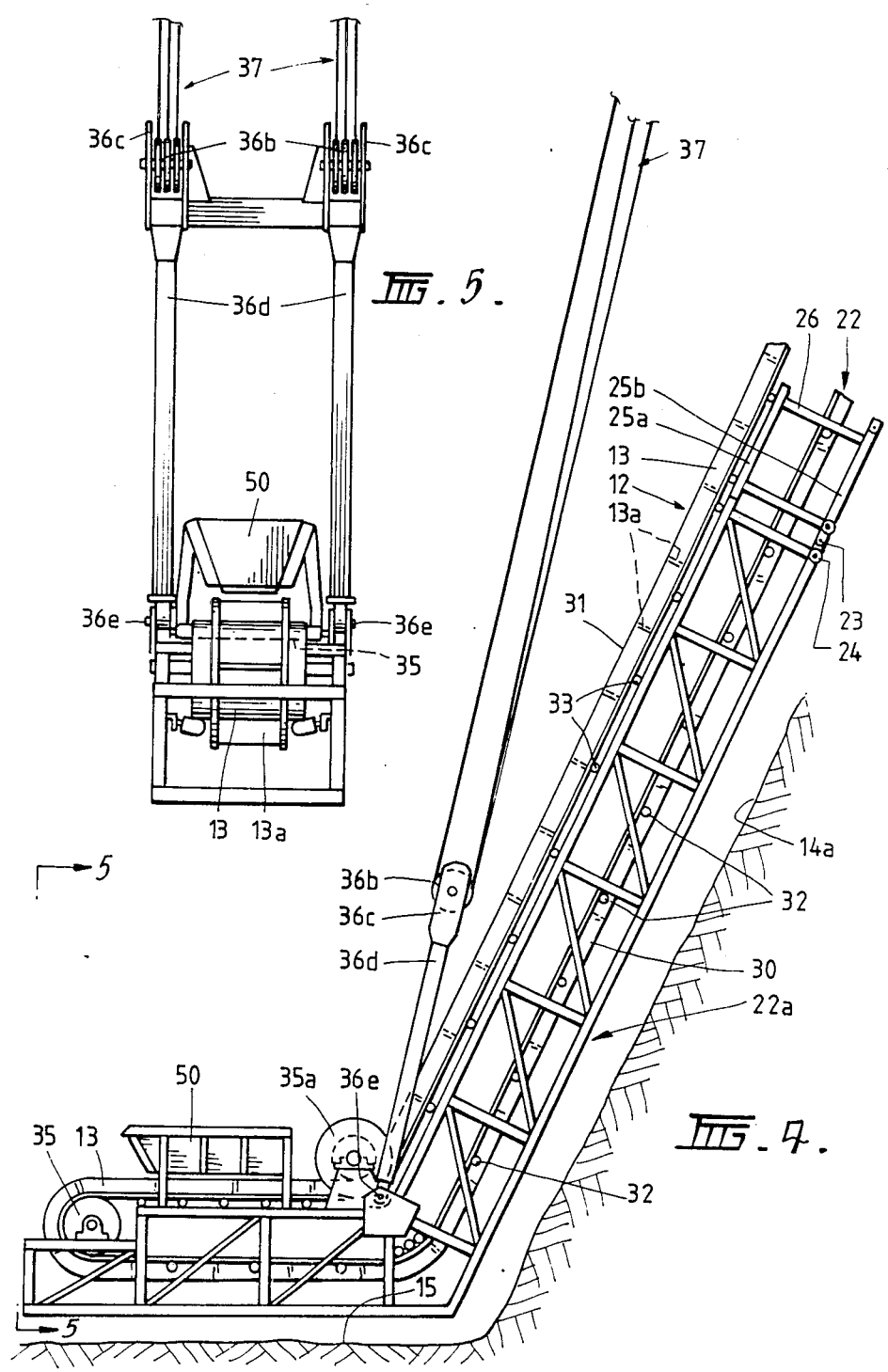

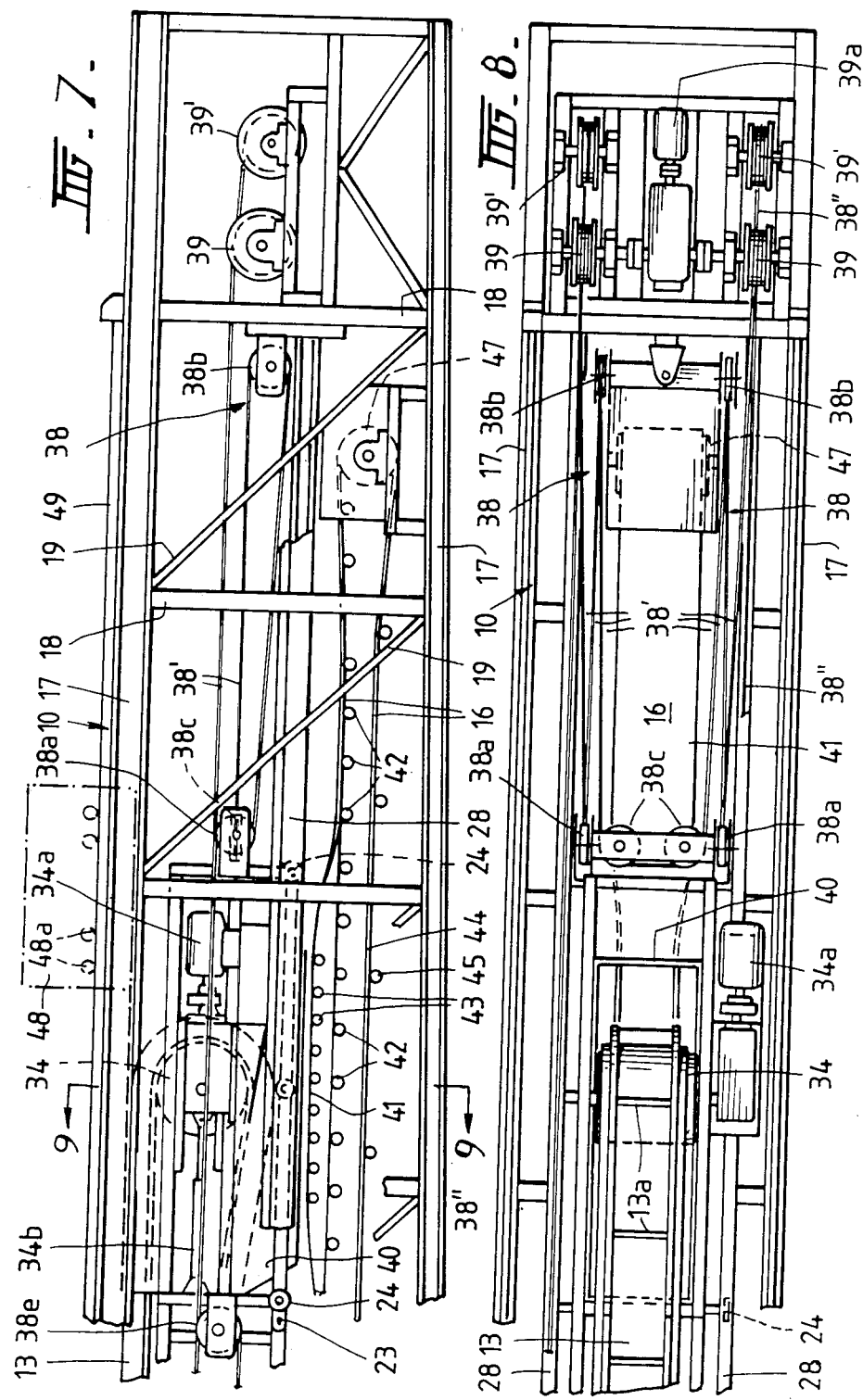

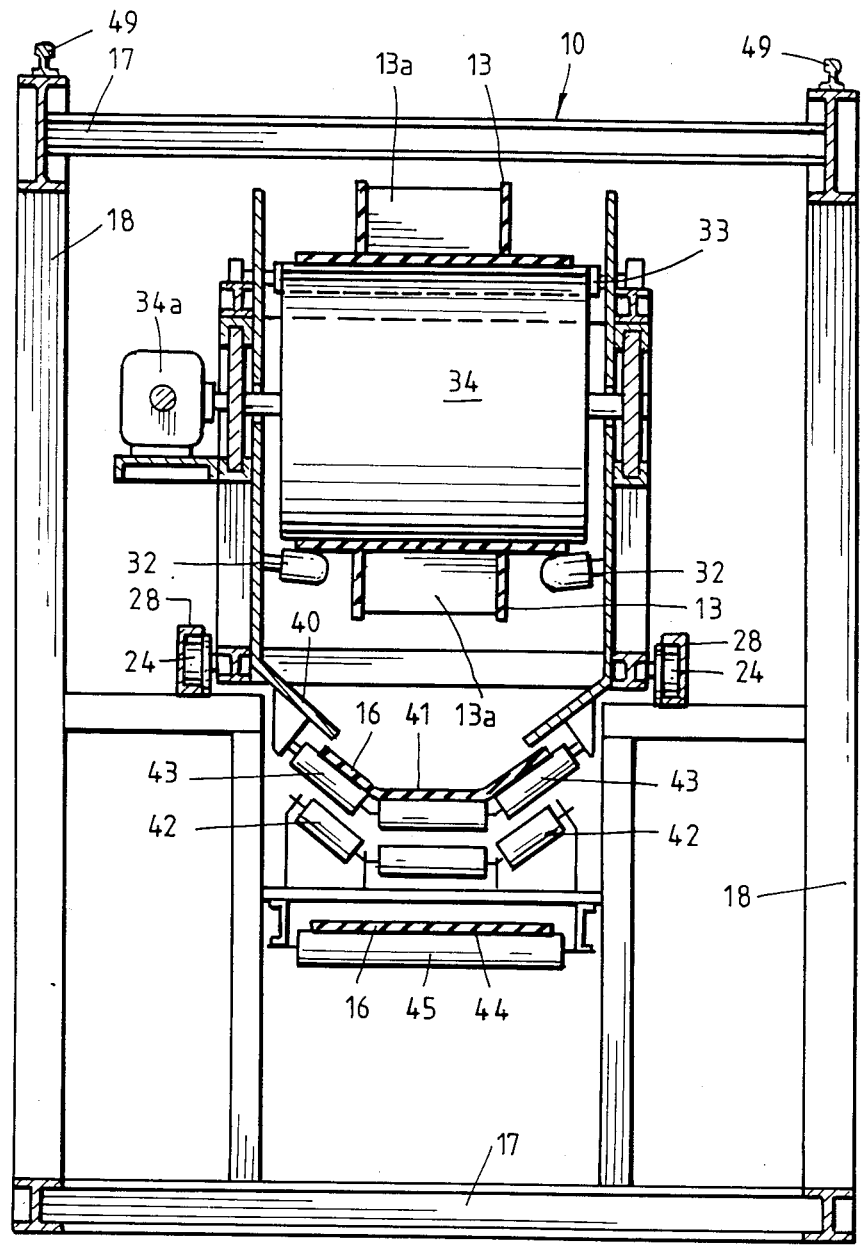
FIG_9

MOBILE ELEVATOR CONVEYOR

TECHNICAL FIELD

The present invention relates to a mobile elevator conveyor. The invention has been particularly developed for opencut mining operations where mined material is to be elevated by a conveyor up the bench face of the pit where it is discharged into trucks or onto further conveyor systems for transportation to a desired location, although the invention is applicable to other situations where elevation of material by conveyors from a lower to an upper level is required.

BACKGROUND ART

With large, and relatively deep, opencut mining operations, it has been known to load material onto trucks at the pit floor by means of backhoes, shovels or front end loaders, with or without an intervening feeder breaker or other crushing device, which trucks transport the material uphill from the pit via a series of roads cut into the pit area. However, as trucking costs increase and the distances which are required to travel increase with increasing pit depths, such a mode of material transportation is no longer favoured and as a substitute therefore large, mobile, steep angle conveyor systems have been developed onto which the material is loaded at the pit floor or lower bench and conveyed up the bench face to the upper bench for transportation away from the pit by trucks or other conveyor systems.

One known steep angle conveyor involves relatively large equipment adapted to move along the upper bench lifting material from the lower bench up the bench face and is fed by a backhoe, shovel or front end loader via a feeder breaker or other crushing device. The requirement for a relatively long boom supporting the conveyor and extending down the bench face requires the main support structure positioned on the upper bench on tracks for movement along the upper bench to be relatively large in order to support the boom and counteract its weight. The resulting equipment is particularly heavy and costly, whilst also being difficult to manouevre when required to be shifted from one location to another. In addition the length of the boom supporting the conveyor down the bench face cannot be easily altered to cope with variations in depth/angle orientations.

In another known proposal the boom supporting the conveyor is supported at both the upper and lower levels of the bench by movable track assemblies to form a mobile bridge conveyor moving along the bench face and onto the lower end of which the material is loaded. However, once again having support at the lower as well as the upper level of the bench makes it difficult to manouevre the equipment from one location to another and once again the length and angle of the conveyor is not easily varied.

It is therefore an object of the present invention to provide a mobile elevator conveyor which overcomes, or at least minimizes, the disadvantages with known mobile elevated conveyors of the type discussed above.

DISCLOSURE OF THE INVENTION

The invention therefore envisages a mobile elevator conveyor, comprising a main support structure mounted on tracks, wheels or the like, for mobility along an upper level when in use, elevating conveyor means supported on a boom structure adapted to be extended from a retracted position within said main frame to an extended position outwardly of said main frame, wherein the boom supporting the conveyor is adapted to bend downwardly to a lower level when in use.

Preferably the boom supporting the conveyor is formed from a plurality of boom segments, and is adapted, during extension and retraction, to pass over an outwardly and downwardly curving guide frame mounted on said main support structure, said boom segments being hingedly connected at their lower edges such that the boom structure bends downwardly along its bottom chord at the hinges between the boom segments as it moves over the guide frame.

BRIEF DESCRIPTION OF THE DRAWINGS

One preferred embodiment of the invention will now be described with reference to the accompanying drawings in which:

FIG. 1 is a side elevational view of the mobile elevator conveyor in accordance with the preferred embodiment of the invention;

FIG. 2 is an enlarged view of the upper section of the outboard section of the elevator conveyor of FIG. 1;

FIG. 3 is an end elevational view along line 3—3 of FIG. 2;

FIG. 4 is an enlarged view of the lower section of the outboard section of the elevator conveyor of FIG. 1;

FIG. 5 is an end elevational view along line 5—5 of FIG. 4;

FIG. 6 is a perspective view of one of the boom segments included in the elevator conveyor of the previous Figures;

FIG. 7 is an enlarged side elevational view of section of the inboard end of the elevator conveyor of FIG. 1;

FIG. 8 is a plan view of the inboard end shown in FIG. 7; and

FIG. 9 is a cross-sectional view taken along line 9—9 of FIG. 7.

BEST MODE FOR CARRYING OUT THE INVENTION

Turning to the drawings the mobile elevator conveyor machine in accordance with the present preferred embodiment of the invention basically comprises a main support structure 10 mounted on a track or crawler unit 11 for mobility, a boom structure 12 incorporating a boom conveyor 13 and adapted to be extended from a retracted position (as shown in FIGS. 7 and 8 and in phantom lines as 12' in FIG. 1) within the main support structure 10, to an extended position outwardly of the main support structure as shown in FIGS. 1, 2 and 4, whereby, with the main support structure 10 situated on an upper bench level 14, the extended boom structure 12 extends down the bench face 14a to a lower bench level 15. Material elevated by the conveyor 13 is discharged onto a collector conveyor 16 within the main support structure 10 and is discharged therefrom onto trucks or other conveyor systems.

The main support structure 10 comprises an arrangement of structural members, including horizontal members 17, vertical members 18 and angled struts 19 to form a rigid structural frame, and having a frame extension 20 protruding outwardly and upwardly angled from one end and over the bench face 14a as shown in FIG. 1. The track or crawler unit 11 for the main support structure may be driven by a diesel, electric or other motor, and provides a low profile with low ground pressure and the ability to slew on the spot. The crawler units 11 may also incorporate a slewing table 21 that can be used to rotate, and rams 21a to level, raise and lower the machine. The crawler units 11 may be integral or detachable to allow it to be used with other equipment such as a mobile crusher or to be shared between several mobile elevating machines. Alternatives to the crawler unit 11 are multiple pneumatic tyre transporters or walking legs. If the machine is not large it can be mounted on unpowered tyre or crawler units and relocatable by using a towing vehicle.

Referring to FIGS. 1, 2, 4 and 6 of the drawings, the boom structure 12 is formed from a plurality of boom segments 22 hingedly connected together by hinge pins 23 at their lower edges and each segment consists of a rectangular frame comprising upper and lower frame members 25a and 25b, vertical frame members 26 and transverse frame members 27 at the tops and bottoms of the segments (see FIG. 6). With reference to FIGS. 2, 4, 6 and 9, adjacent each hinge pin 23 a roller or wheel 24 is provided and adapted to move along tracks 28 having upper and lower guide flanges mounted within and extending along the length of the main support structure 10 and outwardly thereof to provide an outwardly and downwardly curving guide section 29 the outer end section of which is detachably connected at 29a so as to removable when the machine is being transferred from one site to another. The boom structure is therefor extendable from a retracted position within the main support frame 10 to the extended position shown in FIGS. 1, 2 and 4. During extension of the boom structure 12 over the curved guide section 29 of the tracks 28, the boom structure bends along its bottom chord at the hinges 23. The boom structure supports the elevating conveyor 13 which has a lower run 30 moving over lower idler rollers 32 mounted on stub axles are engaging beneath edge portions of an either side of the conveyor, and an upper run 31 moving over upper idler rollers 33. The elevating conveyor 13 may be of a type marketed under the name Flexowell by Conrod Scholtz AG of West Germany, or a similar belt conveyor. Belt conveyors of this type have special cross-stabilized, flat-based belts with flexible corrugated side walls which allow the belt to move over a head pulley 34 driven by a drive motor and gear box arrangement 34a, and a tail pulley 35, and more importantly allow flexibility with the boom segments 22 as they move along the curved guide section 29 of the tracks 28. The head pulley 34 is supported in the end of the boom structure so as to be adjustable lengthwise of the structure by rams 34b which are operated to tension the belt. In addition this type of conveyor has transverse cleats 13a at regular spaced intervals therealong for lifting and conveying the material, and can in fact lift material vertically if required. The width of the cleats is less than the distance between apparent ends of the idler rollers 32 supporting the lower run of the conveyor and such as to pass between the ends of those rollers. Hartmann Band - Gesellschaft mbH of West Germany also markets conveyor belts of this type. Other types of conveyor which could be utilized are sandwich belts of the type marketed by Continental Conveyor and Equipment Company Inc; pipe conveyors as marketed by Japanese Conveyor Co. Limited; or even individual metal buckets supported by a conveyor belt, wire rope, chains or similar attachments.

As shown a guide pulley 35a for the conveyor belt is positioned in the nip adjacent the extreme end of the boom structure, and the end portion of the boom structure is formed as an elongate rigid frame 22a coupled to the remainder structure formed from the boom segments 22.

The boom structure and boom conveyor arrangement 12, 13 is supported down the bench face 14a by a wire rope pulley system 37 as shown in FIGS. 1, 2, 3, 4, and 5 and incorporating a winch 36 with motor and gear box arrangement 36f mounted on the support structure 10 onto and off which wire ropes or cables are wound, and trained around a pulley arrangement 36a on the end of frame extension 20 and extending downwardly to, and around, pulley arrangement 36b which in turn is supported in yokes 36c carried by arms 36d pivotally attached at 36e at the nip toward the end of the boom structure 12 (see FIG. 5). The pulley system by operation of the winch 36 is adjustable to set the angle of the boom arrangement.

The boom structure and boom conveyor arrangement 12, 13 is extended and retracted by a further wire rope pulley system 38 as shown in FIGS. 1, 2, 7 and 8, incorporating a pair of motor driven winch arrangements 39 with a common motor drive 39a, supported within the main support structure 10, and coupled to the head end of the elevating conveyor to winch the conveyor back to the retracted position within the main support structure. The wire ropes of the pulley system 38 are wound around the respective winches 39 and extend away therefrom in two directions. In one direction the ends of one of the the wire ropes 38' extend from each the respective winch arrangement 39, around pulleys 38a supported on horizontal axes and coupled to the head end of the boom structure 12, then back to pulleys 38b having horizontal axes and coupled to the main support structure 10, with the path of the wire rope being completed by a section extending between those sections on either side and extending around a pair of pulleys 38c having vertical axes and also coupled to the head end of the boom structure.

The other of the wire ropes of the system 38" extends firstly in opposite direction from the respective winch arrangements 39 around a reversing pulley 39', past either side of the head end of the boom conveyor arrangement and around pulleys 38d supported on horizontal axes and on either side of the frame extension 20 and then back and around similarly orientated pulleys 38e mounted on the head end boom conveyor arrangement, with the path of the wire rope being completed by a section extending back to the pulleys 38d on either side of the extension 20 then around pulleys 38f having vertical axes and also coupled to the frame extension 20 one on either side thereof. With such an arrangement when the winches are rotated in one direction the wire rope is wound onto the winch from one direction and off the winch from the other to retract the boom conveyor arrangement, whilst when the winches are rotated in the opposite direction winding of the wire rope onto, and off, the winches occurs in the reverse to that described above and the boom conveyor arrangement is extended.

The speeds of the two wire rope pulley systems 37 and 38 may be controlled by interconnected electronic controls for the motors 36f, 39a of their winches 36 and 39 to set the angle of the boom and the amount of extension. The boom angle can be varied between the maximum and minimum allowable by operating one wire rope pulley system independently of the other. As shown in FIGS. 1, 2 and 4, the pulley system 37 straightens the arrangement of boom segments to form a stable boom structure dictated by the positions of the hinges; the moment induced by the pulley system 37; general distribution of masses and the whole geometry of the system, whilst the tension in the boom conveyor also contributes to the stability of the boom structure.

With reference to FIGS. 1, 2, 7, 8 and 9 of the drawings, the collecting conveyor 16 which extends along the length of the main support structure 10 collects material discharging from the boom conveyor irrespective of the amount by which the boom structure has been extended. Material discharges through a chute 40 at the discharge end of the boom conveyor and onto the upper run 41 of the collecting conveyor which is supported on a series of trough idlers 42 spaced apart along the length of the upper run. A series of impact trough idlers 43 are suspended from the head chute 40. The lower run 44 of the collecting conveyor is supported on a series of support rollers 45 spaced along the length of the lower run, with the belt trained over a motor driven head roller 47 and a tail idler roller 46 detachably mounted in the main support structure 10 so as to be moveable lengthwise thereof to adjust belt tension when required.

As an alternative to the boom structure and boom conveyor arrangement 12, 13 supported by a wire rope pulley system 37 so as to be away from the bench wall 14a, an arrangement which rests on the bench wall could be utilized, and in which the segments 22 would be supported on the bench wall by wheels, skids or like devices. With such an alternative arrangement the boom is free to run up and down the wall which would need to have a stable and relatively flat wall surface. In addition, with such an alternative arrangement the self-stabilizing effect of the hinge boom segments is not required. However, the alternative is not as flexible as that of the preferred embodiment due to the required for a stable and relatively flat bench wall, and the requirement to retract the boom structure prior to moving the machine along the upper bench and this requires the conveying operation to stop during such movements. However, the alternative arrangement may prove suitable for some situations.

An alternative to the guide system, utilizing the rollers 24 and guide frame 29 as described, is to use slides of metal or synthetic material which run over the surface of a fabricated guide structure.

The tail or loading end of the boom conveyor may have a simple mobile supply hopper 50 which is fed by a shovel, crusher or feed conveyor/band wagon system. The system may utilize truck transportation depending on the distance from the collecting point to the elevating machine, or alternatively a front end loader or similar machine may be used. If the material lump size is acceptable the crusher could be deleted from the above system and the shovel or front end loader could dump directly into the hopper. A feeder (belt, apron or vibratory) could control the feed onto the boom conveyor loading point. A continuous miner such as a "Voest Alpine" or "Dosco" type road header, or bucketwheel reclaimer, or other continuous miner, may also be utilized to feed material directly onto the boom conveyor loading point. It should be noted that the elevating machine of the present invention forms a link in a long conveyor system, that is, the elevating machine can be fed by a long conveyor and discharge onto a long conveyor, and several elevating conveyor machines could be used throughout the length of a total system of this type.

In some situations, depending on the depth of the bench and other factors, a counterweight is provided either at a fixed location on the main support structure or as shown in this embodiment adjustable along the length thereof. Such an adjustable counterweight 48 can be moved automatically on rollers 48a along a track 49 mounted on the main support structure 10 to balance the machine as the boom structure is extended, with the counterweight 48 positioned as shown in solid lines in FIGS. 1, or retracted, with the counterweight 48 positioned as shown in phantom lines in FIG. 1, and such could be simply achieved by a wire rope/pulley system (not shown).

All drives and controls for the machine may be electric powered through a land cable via a cable reeler. The main drive for moving the machine could be diesel electric to allow the machine to relocate over long distances, although the drive could be purely electric. As an all electric system may not be feasible for areas remote from a power supply, or where the machine must operate in several widely spaced areas, the machine could be powered by an integral or separate diesel electric generator set. If integral, the set could for example replace part of the travelling counterweight or otherwise be place in a position to benefit the machine balance. The generating set could be gas turbine or internal combustion fueled by alternative vegetable or other oils. The machine could also be driven by direct coupled internal combustion (diesel) engines. This would depend on the machine power requirements. In summary, the power system selected would be based on the machine requirements and the availability and price of the various energy alternatives.

A mobile elevator conveying machine of the type described above offers significant advantages over the known machines discussed previously, the major advantages being;

(a) The machine is much lighter than existing proposals for single support mobile elevator conveyors. The expected saving could be as much as 50% depending on the particular machine application.

(b) The machine height is greatly reduced existing proposals, and can be reduced to 20% of such proposals. Again, this is dependant of the particular application, and the benefits are, reduced windloads, greater stability and faster relocation.

(c) When the boom structure and boom conveyor arrangement 12, 13 is retracted, to allow for machine relocation, the machine is compact allowing for rapid relocation in difficult mine situations, whilst existing proposals are cumbersome making relocations slow and difficult.

(d) The length of the boom structure and conveyor arrangement 12, 13 can be varied to suit the particular bench height.

(e) The angle of the boom structure and conveyor arrangement 12, 13 can be varied to suit the wall angle as required.

(f) This machine may be manufactured from standard components all of which have been tried and tested and accepted as common and reliable by the industry.

(g) The boom structure and conveyor arrangement 12,13 can be readily serviced when it is in the fully retracted position within the main support structure 10 and hence the boom arrangement 12, 13 does not require heavy walkways and stairs which would increase its overall weight.

(h) The machine is feasible for bench depths exceeding present limits, i.e. 55 m or more. Other machine proposals are not considered to be feasible for use with such depths.

We claim:

1. A mobile elevator conveyor, comprising a main support structure mounted on ground engaging means for mobility along an upper level when in use, elevating conveyor means supported on a boom structure and extendable from a retracted position within said main support structure to an extended position extending downwardly away from said main support structure to a lower level, wherein the boom structure supporting the elevating conveyor means is formed from a plurality of boom segments hingedly connected at lower edges such that, at said main support structure, the boom structure bends downwardly along a bottom chord at the hinges between the boom segments, and wherein adjacent sides of said boom segments engage each other when pivoted about said hinges in a direction opposite to the downward bending of said boom structure over the remainder of the length of said boom structure extending to said lower level and such as to resist bending of said remainder of said extended length of boom structure in said opposite direction.

2. A mobile elevator conveyor as claimed in claim 1, wherein said boom structure during extension and retraction passes over an outwardly and downwardly curving guide frame mounted on said main support structure.

3. A mobile elevator conveyor as claimed in claim 1, wherein said main support structure carries a collecting conveyor extending along its length and adapted to receive material from said elevating conveying means, at least whilst said elevating conveyor means is in said extended position, and so as to convey material to a discharge point from said mobile elevator conveyor.

4. A mobile elevator conveyor as claimed in claim 1, wherein said elevating conveyor means and its supporting boom structure is extended and retracted by a winch operated pulley system extending between said main support structure and said boom structure.

5. A mobile elevator conveyor as claimed in claim 1, wherein such elevating conveyor means and its supporting boom structure is adapted to be raised and lowered in its extended position to alter its downward inclination.

6. A mobile elevator conveyor as claimed in claim 5, wherein elevation means are provided to raise and lower said elevating conveyor means and its supporting structure and thereby adjust an angle of inclination of said conveyor means and supporting structure.

7. A mobile elevator conveyor as claimed in claim 6, wherein said elevating conveyor means and its supporting structure are raised and lowered by a winch operated pulley system coupled to said main support structure.

8. A mobile elevator conveyor as claimed in claim 6, wherein extension means are provided to extend said conveyor means and its supporting boom structure to a downwardly inclined position, and to retract them from that position, wherein said elevation means and said extension means are coupled to a common control wherein said angle of inclination and the amount of extension and retraction are controlled in unison.

9. A mobile elevator conveyor as claimed in claim 1, wherein said main support structure is supported on said ground engaging means, by means which allow said main support structure to slew relative thereto and by means to raise and lower said main support structure.

10. A mobile elevator conveyor as claimed in claim 2, wherein said main support structure carries a collecting conveyor extending along its length and adapted to receive material from said elevator conveying means, at least whilst said elevating conveyor means is in said extended position, and so to convey material to a discharge point from said mobile elevator conveyor.

11. A mobile elevator conveyor as claimed in claim 1, wherein said main support structure carries a collecting conveyor extending along its length and adapted to receive material from said elevating conveyor means, at least whilst said elevating conveyor means is in said extended position, and so as to convey material to a discharge point from said mobile elevator conveyor.

12. A mobile elevator conveyor as claimed in claim 2, wherein said elevating conveyor means and its supporting boom structure is extended and retracted by a winch operated pulley system extending between said main support structure and said boom structure.

13. A mobile elevator conveyor as claimed in claim 1, wherein said elevating conveyor means and its supporting boom structure is extended and retracted by a winch operated pulley system extending between said main support structure and said boom structure.

14. A mobile elevator conveyor as claimed in claim 1, wherein such elevating conveyor means and its supporting boom structure is adapted to be raised and lowered in its extended position to alter its downward inclination.

15. A mobile elevator conveyor as claimed in claim 2, wherein such elevating conveyor means and its supporting boom structure is adapted to be raised and lowered in its extended position to alter its downward inclination.

16. A mobile elevator conveyor as claimed in claim 1, wherein said main support structure is supported on said tracks, wheels or the like, by means which allow it to slew relative thereto and by means to raise and lower said support structure.

17. A mobile elevator conveyor as claimed in claim 2, wherein said main support structure is supported on said tracks, wheels or the like, by means which allow it to slew relative thereto and by means to raise and lower said support structure.

* * * * *